(12) United States Patent
Okazaki et al.

(10) Patent No.: US 8,426,069 B2
(45) Date of Patent: Apr. 23, 2013

(54) BATTERY HAVING A BELT-LIKE SEPARATOR

(75) Inventors: Sadayuki Okazaki, Osaka (JP); Shinji Mino, Osaka (JP); Masaya Ugaji, Osaka (JP); Masayoshi Hiramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1329 days.

(21) Appl. No.: 11/913,349

(22) PCT Filed: May 1, 2006

(86) PCT No.: PCT/JP2006/309096
§ 371 (c)(1),
(2), (4) Date: Nov. 1, 2007

(87) PCT Pub. No.: WO2006/120959
PCT Pub. Date: Nov. 16, 2006

(65) Prior Publication Data
US 2009/0029259 A1   Jan. 29, 2009

(30) Foreign Application Priority Data
May 10, 2005   (JP) ................................ 2005-137656

(51) Int. Cl.
*H01M 2/16* (2006.01)
(52) U.S. Cl.
USPC ........................................................ 429/246
(58) Field of Classification Search .................... 429/246
See application file for complete search history.

(56) References Cited

U.S. PATENT DOCUMENTS

2002/0132167 A1   9/2002   Gan et al.
2005/0031953 A1   2/2005   Watanabe et al.

FOREIGN PATENT DOCUMENTS

| JP | 08138726 | | 5/1996 |
|---|---|---|---|
| JP | 08138726 A | * | 5/1996 |
| JP | 9-320637 | | 12/1997 |
| JP | 2002329530 | | 11/2002 |
| JP | 2002329530 A | * | 11/2002 |
| JP | 2002-367601 | | 12/2002 |
| JP | 2003-068364 | | 3/2003 |
| JP | 2003-203671 | | 7/2003 |
| JP | 2004-079218 | | 3/2004 |
| JP | 2004253340 | | 9/2004 |
| JP | 2005-063775 | | 3/2005 |

OTHER PUBLICATIONS

International Search Report dated Aug. 1, 2006.

* cited by examiner

*Primary Examiner* — Karie O'Neill Apicella
(74) *Attorney, Agent, or Firm* — Dickinson Wright PLLC

(57) ABSTRACT

A battery of this invention includes: a separator which is folded in a zigzag manner, thereby forming a layered structure having at least one first-electrode holding part and at least one second-electrode holding part which are alternately aligned; a first electrode accommodated in the first-electrode holding part; and a second electrode accommodated in the second-electrode holding part. At least one of the first electrode and the second electrode has at least one protruding part. The first electrode is connected to a first terminal, and the second electrode is connected to second terminal.

15 Claims, 10 Drawing Sheets

BATTERY HAVING A BELT-LIKE SEPARATOR

TECHNICAL FIELD

The present invention relates to a battery in which the current collector is connected to an external terminal in a reliable manner.

BACKGROUND ART

As electronic and electric devices are increasingly becoming more compact, more lightweight, or thinner, there is also a growing demand that electrochemical devices such as secondary batteries used as the power source for such devices be more compact, more lightweight, or thinner. For example, lithium secondary batteries are equipped with a roll-type electrode plate group that is obtained by laminating a positive electrode comprising a current collector and a positive electrode active material layer formed thereon and a negative electrode comprising a current collector and a negative electrode active material layer formed thereon, with a separator interposed there between, and winding the resultant trilaminar sheet. Alternatively, lithium secondary batteries are equipped with an electrode plate group having a layered structure that is obtained by folding the above-mentioned trilaminar sheet a plurality of times. Further, there has been proposed an electrode plate group that is obtained by alternately laminating a plurality of positive electrode sheets and a plurality of negative electrode sheets with a separator interposed there between so that the separator is folded in a zigzag manner between the positive electrode sheets and the negative electrode sheets (e.g., see Patent Document 1).

Meanwhile, to increase volume energy density, it has been proposed, for example, to laminate a positive electrode active material or negative electrode active material on a separator and forming a thin internal electrode layer (current collector) on the active material (e.g., see Patent Document 2). In this way, by reducing the thickness of the current collector and thus increasing volume energy density, it is possible to realize a thin, high-energy-density battery.

Further, to improve the output characteristics, reliability, and capacity of the battery, it has been proposed to use a current collector sheet composed of a resin sheet and a conductive layer of a predetermined pattern formed on each side thereof (e.g., see Patent Document 3).

Patent Document 1: Japanese Laid-Open Patent Publication No. 2002-329530
Patent Document 2: Japanese Laid-Open Patent Publication No. Hei 8-138726
Patent Document 3: Japanese Laid-Open Patent Publication No. 2004-253340

DISCLOSURE OF INVENTION

Problem to be Solved by the Invention

However, in batteries having the structure as described in Patent Document 1, if the thickness of the current collector is very thin, it is difficult to connect the current collector included in each of the plurality of positive electrode sheets or the plurality of negative electrode sheets to an external terminal.

In Patent Document 2, a unit composed of the separator, the active material layer formed on the separator, and the internal electrode layer formed on the active material layer is folded into two such that the internal electrode layer is positioned inward. When the unit is folded into two, the thickness of the separator doubles. Thus, the battery thickness may not be reduced despite the use of the thin internal electrode layer. It is therefore not possible to significantly enhance volume energy density. Further, as in the above-described case, since the internal electrode layer is very thin, it is difficult to connect the internal electrode layer included in the above-mentioned unit to an external terminal.

As in Patent Document 3, in the case of using a current collector composed of a resin sheet and metal thin film conductive layers formed thereon, the battery has a low energy density since it includes the resin sheet that is not related to battery reaction. In the case of using a current collector composed only of a metal thin film, the energy density is not low since the current collector includes no resin sheet. However, when the thickness of the current collector composed of the metal thin film is 5 µm or less, the current collector is difficult to handle unless it is supported by a support.

It is therefore an object of the present invention to provide a battery in which even a thin current collector with a thickness of 5 µm or less can be connected to an external terminal in a reliable manner.

Means for Solving the Problem

A battery of the present invention includes: at least one first electrode, at least one second electrode, and a belt-like separator. The separator is folded in a zigzag manner, thereby forming a layered structure having at least one first-electrode holding part and at least one second-electrode holding part which are alternately aligned. The layered structure has a first end face where at least one first bent part is disposed and a second end face where at least one second bent part is disposed. The first end face is positioned on the opposite side of the second end face. The first-electrode holding part has an open space on the first end face side while the second-electrode holding part has an open space on the second end face side. The first-electrode holding part accommodates the first electrode, and the second-electrode holding part accommodates the second electrode. The first electrode and the second electrode each have two electrode sections each including a current collector and an active material layer carried on one face thereof. The two electrode sections are disposed such that the current collectors are in contact with each other. At least one of the first electrode and the second electrode is such that at least one of the two electrode sections has a protruding part that protrudes toward the open space of the end face. The protruding part includes the current collector and the active material layer. The first end face has a first terminal connected to the first electrode while the second end face has a second terminal connected to the second electrode. Each of the first terminal and the second terminal preferably comprises a metal film. Also, each of the first terminal and the second terminal preferably has a lead.

In at least one of the first electrode and the second electrode, the two electrode sections can be formed by folding one electrode plate including a current collector and an active material layer carried on one face thereof such that the folded faces of the current collector not carrying the active material layer are in contact with each other. Alternatively, the two electrode sections can be formed by laminating two electrode plates, each including a current collector and an active material layer carried on one face thereof, such that the faces of the current collectors not carrying the active material layer are in contact with each other.

When the two electrode sections are formed by folding one electrode plate, the one electrode plate is preferably folded such that two sides of the electrode plate parallel to the folding axis thereof are shifted in the length direction of the electrode plate, so that only one of the two electrode sections has a protruding part throughout the width of the electrode section.

In at least one of the first electrode and the second electrode, each of the two electrode sections preferably has the protruding part of equal area. The current collector included in at least one of the first electrode and the second electrode preferably has a thickness of 0.1 μm to 5 μm.

Preferably, an electrode accommodated in each electrode-holding part at each end of the layered structure comprises an electrode plate including a current collector and an active material layer carried on one face thereof, and the active material layer is opposed to an active material layer of an electrode accommodated in an adjacent electrode-holding part with the separator interposed there between.

The present invention also relates to a battery including two first electrodes, one second electrode, and a belt-like separator. The separator is folded in a zigzag manner, thereby forming a layered structure having two first-electrode holding parts and one second-electrode holding part interposed there between. The layered structure has a first end face where one first bent part is disposed and a second end face where two second bent parts are disposed. The first end face is positioned on the opposite side of the second end face. The first-electrode holding parts have an open space on the first end face side while the second-electrode holding part has an open space on the second end face side. Each of the first-electrode holding parts accommodates each of the first electrodes, and the second-electrode holding part accommodates the second electrode. Each of the first electrodes has one electrode section including a current collector and an active material layer carried on one face thereof. The second electrode has two electrode sections each including a current collector and an active material layer carried on one face thereof. The two electrode sections are disposed such that the current collectors are in contact with each other. The active material layer of each of the first electrodes is opposed to the active material layer of the second electrode with the separator interposed there between. At least one of the two electrode sections of the second electrode and the electrode sections of the first electrodes has at least one protruding part that protrudes toward the open space of the end face. The protruding part includes the current collector and the active material layer. The first end face has a first terminal connected to the first electrode while the second end face has a second terminal connected to the second electrode.

Effects of the Invention

In the battery of the present invention, at least one of the first electrode and the second electrode has a protruding part that protrudes toward the open space. Further, each first electrode and/or each second electrode included in the battery are/is connected to the terminal(s) via the protruding part(s). Hence, even when the current collector is thin, current can be collected from the current collector in a reliable manner by forming a terminal on the end face where the protruding part is disposed.

BRIEF DESCRIPTION OF THE DRAWINGS

FIG. 22 is a longitudinal sectional view of an electrode plate group composed of a plurality of first electrodes and a plurality of second electrodes which are laminated with a separator interposed there between;

BEST MODE FOR CARRYING OUT THE INVENTION

The battery of the present invention includes at least one first electrode, at least one second electrode, and a belt-like separator. The separator is folded in a zigzag manner, thereby forming a layered structure having at least one first-electrode holding part and at least one second-electrode holding part which are alternately aligned. The layered structure has a first end face where at least one first bent part is disposed and a second end face where at least one second bent part is disposed. The first end face is positioned on the opposite side of the second end face. The first-electrode holding part has an open space on the first end face side while the second-electrode holding part has an open space on the second end face side. The first-electrode holding part accommodates the first electrode, and the second-electrode holding part accommodates the second electrode. The first electrode and the second electrode each have two electrode sections each including a current collector and an active material layer carried on one face thereof. The two electrode sections are disposed such that the current collectors are in contact with each other. At least one of the first electrode and the second electrode is such that at least one of the two electrode sections has a protruding part that protrudes toward the open space of the end face. The protruding part includes the current collector and the active material layer. The first end face has a first terminal connected to the first electrode while the second end face has a second terminal connected to the second electrode.

Figure 1:
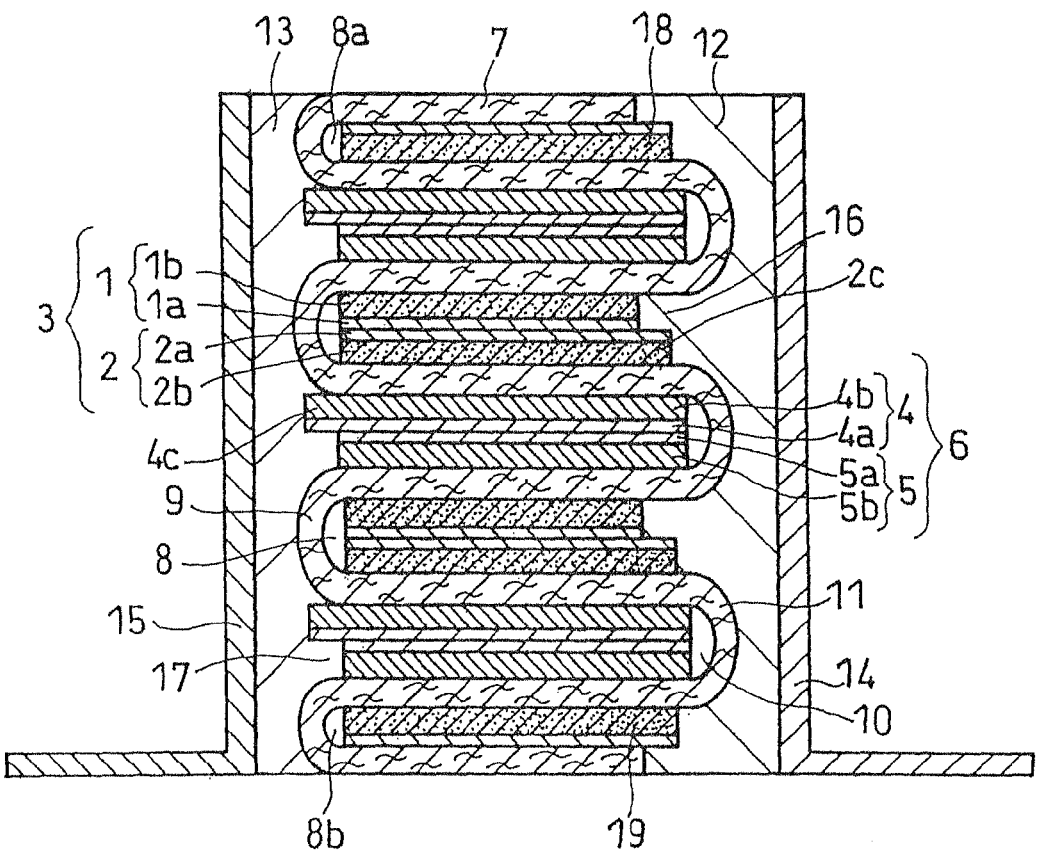
FIG. 1 is a schematic longitudinal sectional view of an electrode plate group used in a battery according to one embodiment of the present invention.

FIG. 1 illustrates an electrode plate group used in a battery according to one embodiment of the present invention. In this embodiment, the battery of the present invention is described as a lithium ion secondary battery, but the present invention is applicable to other secondary batteries.

The electrode plate group illustrated in FIG. 1 includes four first electrodes 3, three second electrodes 6, and one belt-like separator 7. In the following description, the first electrode is a positive electrode and the second electrode is a negative electrode, but the first electrode may be a negative electrode and the second electrode may be a positive electrode.

Each positive electrode 3 has two electrode sections, namely, a first positive electrode section 1 and a second positive electrode section 2. The first positive electrode section 1 includes a belt-like first positive electrode current collector 1a and a first positive electrode active material layer 1b carried on one face thereof. The second positive electrode section 2 includes a belt-like second positive electrode current collector 2a and a second positive electrode active material layer 2b carried on one face thereof.

Likewise, each negative electrode 6 has a first negative electrode section 4 and a second negative electrode section 5. The first negative electrode section 4 includes a belt-like first negative electrode current collector 4a and a first negative electrode active material layer 4b carried on one face thereof. The second negative electrode section 5 includes a belt-like second negative electrode current collector 5a and a second negative electrode active material layer 5b carried on one face thereof.

In the positive electrode 3, the first positive electrode section 1 and the second positive electrode section 2 are laminated such that the face of the first positive electrode current collector 1a not carrying the active material layer is in contact with the face of the second positive electrode current collector 2a not carrying the active material layer. In the negative electrode 6, the first negative electrode section 4 and the second negative electrode section 5 are also laminated such that the face of the first negative electrode current collector 4a not carrying the active material layer is in contact with the face of the second negative electrode current collector 5a not carrying the active material layer.

The separator 7 is folded in a zigzag manner, thereby forming a layered structure having first-electrode holding parts 8 and second-electrode holding parts 10, which are alternately aligned. In FIG. 1, the layered structure has four first-electrode (positive electrode) holding parts 8 and three second-electrode (negative electrode) holding parts 10. The layered structure also has a first end face where three first bent parts 11 are disposed and a second end face where four second bent parts 9 are disposed. The first end face is positioned on the opposite side of the second end face.

Each of the first-electrode holding parts 8 has an open space 16 on the first end face side and a second bent part 9 on the second end face side. Each of the second-electrode holding parts 10 has an open space 17 on the second end face side and a first bent part 11 on the first end face side. Each positive electrode 3 is accommodated in each first-electrode holding part 8, while each negative electrode 6 is accommodated in each second-electrode holding part 10. The active material layers of the positive electrode 3 are opposed to the active material layers of the negative electrode 6 with the separator 7 interposed there between.

In FIG. 1, the first-electrode holding parts 8 and the second-electrode holding parts 10 are U-shaped in cross-section. The cross-section of each electrode holding part is not necessarily in the shape composed only of straight lines and a curved line and may be in the shape of the Japanese Katakana character コ in which the curved line is replaced with a straight line. Alternatively, it may be in the shape in which the curved line is composed of a plurality of straight lines. Also, the cross-section of the electrode-holding part may be V-shaped. In actual batteries, if the separator is slack, it may have a U-shaped cross-section, and if the separator is under tension, it may have a V-shaped or コ-shaped cross-section.

In the present invention, in at least one of the first electrode and the second electrode, at least one of the two electrode sections has at least one protruding part. In FIG. 1, each of the two electrode sections of both positive and negative electrodes has one protruding part.

Each of the two electrode sections of the positive electrode 3 has a protruding part that protrudes toward the open space 16 of the first-electrode holding part 8 on the first end face side. Each of the two electrode sections of the negative electrode 6 has a protruding part that protrudes toward the open space 17 of the second-electrode holding part 10 on the second end face side. Each of these protruding parts is composed of the current collector and the active material layer. It should be noted, however, that FIG. 1 illustrates each of the second positive electrode sections 2 having a protruding part 2c and each of the first negative electrode sections 4 having a protruding part 4c.

A first terminal (positive electrode current-collecting terminal) 12 is formed on the first end face where the protruding parts of the positive electrodes are disposed. A second terminal (negative electrode current-collecting terminal) 13 is formed on the second end face where the protruding parts of the negative electrodes are disposed. The protruding parts of the respective positive electrodes are connected to the first terminal 12, while the protruding parts of the respective negative electrodes are connected to the second terminal 13.

As described above, each of the positive electrode and the negative electrode has the protruding part. Thus, even when the current collector has a small thickness of 0.1 to 5 μm, the current collector is firmly supported by the active material layer and the current collector is connected to the terminal in an increased area. This ensures reliable connection between the current collector and the terminal. Also, in the present invention, since the current collector is supported by the active material layer, the thickness of the current collector can be reduced to 0.1 to 5 μm. If the thickness of the current collector is less than 0.1 μm, the specific resistance of the current collector may increase.

The first terminal and the second terminal preferably have a thickness of 0.1 mm to 1 mm in the direction perpendicular to the thickness direction of layered structure of the separator.

Further, the first terminal 12 is connected to a first lead 14, while the second terminal 13 is connected to a second lead 15. The first terminal is connected to all the positive electrodes, while the second terminal is connected to all the negative electrodes. Hence, even when a plurality of positive electrodes and a plurality of negative electrodes are used, each of the first terminal and the second terminal can be simply connected to a lead terminal, and there is no need to connect a lead terminal to each of all the electrodes.

As illustrated in FIG. 1, the first terminal 12 and the second electrodes 6 do not come into contact with one another since the first bent parts 11 of the separator 7 are interposed therebetween. The second terminal 13 and the first electrodes 3 do not come into contact with one another since the second bent parts 9 of the separator 7 are interposed there between.

The positive electrode active material layer contains a positive electrode active material. In the case of lithium ion secondary batteries, the positive electrode active material can be, for example, a lithium-containing transition metal oxide. Examples of lithium-containing transition metal oxides include $Li_xCoO_z$, $Li_xNiO_z$, $Li_xMnO_z$, $Li_xCo_yNi_{1-y}O_z$, $Li_xCo_yV_{1-f}O_z$, $Li_xNi_{1-y}M_yO_z$ (M=Ti, V, Mn, or Fe), $Li_xCO_aNi_bM_cO_z$ (M=Ti, Mn, Al, Mg, Fe, or Zr), $Li_xMn_2O_4$, and $Li_xMn_{2(1-y)}M_{2y}O_4$ (M=Na, Mg, Sc, Y, Fe, Co, Ni, Ti, Zr, Cu, Zn, Al, Pb, or Sb). However, when the battery is charged/discharged, the value x changes such that $0 \leq x \leq 1.2$. Also, $0 \leq y \leq 1$, $0.9 \leq f \leq 0.98$, $1.9 \leq z \leq 2.3$, $a+b+c=1$, $0 \leq a \leq 1$, $0 \leq b \leq 1$, and $0 \leq c \leq 1$. They may be used singly or in combination of two or more of them.

The positive electrode active material used is changed as appropriate depending on the kind of the battery produced.

The negative electrode active material layer contains a negative electrode active material. In the case of lithium ion secondary batteries, examples of negative electrode active materials include lithium, lithium alloys, intermetallic compounds, carbon materials, silicon (Si), silicon oxide ($SiO_x$), tin (Sn), organic and inorganic compounds capable of absorbing and desorbing lithium ions, metal complexes, and organic polymer compounds. They may be used singly or in combination of two or more of them.

Examples of carbon materials include coke, pyrolytic carbon, natural graphite, artificial graphite, mesocarbon microbeads, graphitized mesophase microspheres, vapor grown carbon, glassy carbon, carbon fibers (polyacrylonitrile type, pitch type, cellulose type, vapor grown type), amorphous carbon, and baked organic compounds. Among them, natural graphite and artificial graphite are particularly preferred.

When the negative electrode active material contains at least one of Si, $SiO_x$ and Sn, the negative electrode active material layer may be a deposited film containing such element(s).

The kind of the negative electrode active material is also changed as appropriate depending on the kind of the battery produced.

The positive electrode active material layer and the negative electrode active material layer may contain a conductive agent and/or a binder if necessary. In the case of lithium ion secondary batteries, examples of conductive agents include carbon black such as acetylene black and graphite. Examples of binders include fluorocarbon resin such as polyvinylidene fluoride and polytetra fluoroethylene, acrylic resin, styrene butadiene rubber, and ethylene propylene terpolymer.

The kind of the conductive agent and binder is also changed as appropriate depending on the kind of the battery.

The positive electrode current collector and the negative electrode current collector can be a sheet or thin film made of a metal material known in the art. In the case of lithium ion secondary batteries, the material of the positive electrode current collector can be aluminum. The material of the negative electrode current collector can be copper.

The material of the positive electrode current-collecting terminal serving as the first terminal can be a material known in the art. For example, a metal aluminum film or a porous film made of metal aluminum can be used as the positive electrode current-collecting terminal. The material of the negative electrode current-collecting terminal serving as the second terminal can be a material known in the art. For example, a copper metal film or a porous film made of copper can be used as the negative electrode current-collecting terminal. When the first electrode is a negative electrode and the second electrode is a positive electrode, the first terminal is a negative electrode current-collecting terminal and the second terminal is a positive electrode current-collecting terminal.

The first terminal and the second terminal can be formed by vacuum deposition, sputtering, thermal spraying, or the like. Also, the first terminal and the second terminal can be formed by applying a conductive paste containing metal particles onto an end face and drying it.

The use of such first and second terminals ensures reliable connection of these terminals with the current collectors.

The separator can be, for example, woven fabric or non-woven fabric made of an olefin polymer such as polyethylene or polypropylene or glass fibers.

The positive electrode lead 14 and the negative electrode lead 15 can be any known one in the art. The material of the positive electrode lead can be, for example, metal aluminum. The material of the negative electrode lead can be, for example, metal nickel. When the first electrode is a negative electrode and the second electrode is a positive electrode, the first lead is a negative electrode lead and the second lead is a positive electrode lead.

Also, the first lead and the second lead may be embedded in the first terminal and the second terminal, respectively. This ensures more reliable connection of the leads to the terminals.

In FIG. 1, first-electrode holding parts 8a and 8b are positioned at both ends of the layered structure of the separator in the thickness direction, respectively. The positive electrodes accommodated in the first-electrode holding parts 8a and 8b are preferably electrode plates 18 and 19, respectively, each including a current collector and an active material layer carried on one face thereof. At this time, the active material layer of the positive electrode accommodated in each of the first-electrode holding parts 8a and 8b is opposed to the active material layer of the negative electrode accommodated in the adjacent second-electrode holding part with the separator interposed there between.

As illustrated in FIG. 1, in order that at least a part of the positive electrode current collector of the positive electrode accommodated in each of the first-electrode holding parts 8a and 8b is exposed to outside, it is preferable not to cover the whole surface of the current collector with the separator. This ensures reliable current collection from the electrode plates positioned at both ends of the electrode plate group in the laminating direction thereof. The electrodes accommodated in the first-electrode holding parts 8a and 8b may or may not have a protruding part. FIG. 1 illustrates an electrode plate group in which the electrodes accommodated in the first-electrode holding parts 8a and 8b do not have a protruding part.

Figure 2:
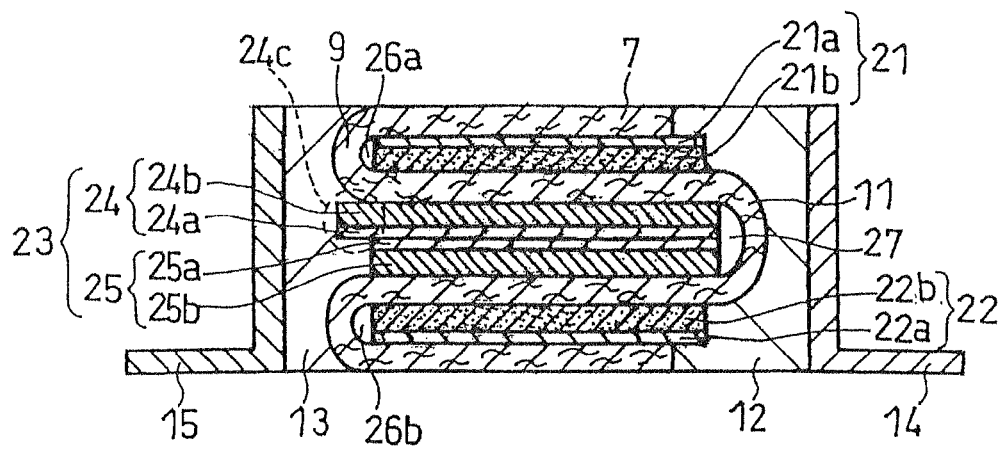
FIG. 2 is a schematic longitudinal sectional view of an electrode plate group used in a battery according to another embodiment of the present invention.

Referring now to FIG. 2, an electrode plate group in which one second electrode is sandwiched between two first electrodes is described. In FIG. 2, the same constituent elements as those of FIG. 1 are given the same numbers.

The electrode plate group as illustrated in FIG. 2 includes two first electrodes 21 and 22, one second electrode 23, and a belt-like separator 7. The separator 7 is folded in a zigzag manner, thereby forming a layered structure having two first-electrode holding parts 26a and 26b and one second-electrode holding part 27 interposed there between. The first electrode 21 accommodated in the first-electrode holding part 26a is made of one electrode plate including a current collector 21a and an active material layer 21b carried thereon. Likewise, the first electrode 22 accommodated in the first-electrode holding part 26b is made of one electrode plate including a current collector 22a and an active material layer 22b carried thereon. That is, in the electrode plate group of FIG. 2, the first electrode has only one electrode section.

The second electrode 23 has two electrode sections 24 and 25. The electrode section 24 includes a current collector 24a and an active material layer 24b carried on one face thereof. The electrode section 25 includes a current collector 25a and an active material layer 25b carried on one face thereof. The electrode section 24 and the electrode section 25 are disposed such that the current collector 24a and the current collector 25a are in contact with each other.

In the electrode plate group of FIG. 2, the active material layer 21b of the first electrode 21 is opposed to the active material layer 24b of the second electrode 23 with the separator 7 interposed there between, while the active material layer 22b of the first electrode 22 is opposed to the active material layer 25b of the second electrode 23 with the separator 7 interposed there between.

Each of the two electrode sections of the second electrode has a protruding part that protrudes toward the open space of the second end face. In FIG. 2, a protruding part 24c of the electrode section 24 of the second electrode 23 is shown. In FIG. 2, the electrode section of each first electrode does not have a protruding part. In the same manner as in the second electrode, the electrode section of each first electrode may have a protruding part that protrudes toward the open space of the first end face. Each electrode section may have one protruding part or two or more protruding parts.

Next, each of the positive electrodes 3 and the negative electrodes 6 is described with reference to drawings. In the following drawings, the same constituent elements as those of FIG. 1 are given the same numbers as those of FIG. 1.

Figure 3:
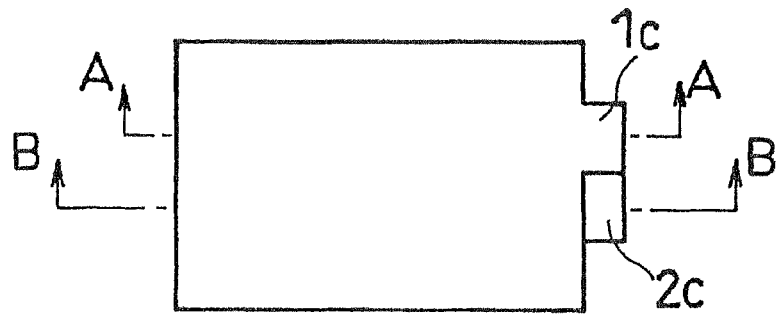
FIG. 3 is a schematic top view of a first electrode included in the battery according to one embodiment of the present invention.
Figure 4:
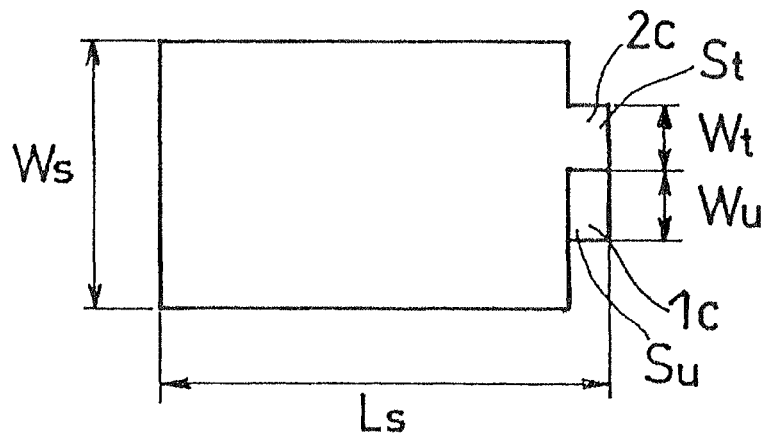
FIG. 4 is a schematic bottom view of the first electrode included in the battery according to one embodiment of the present invention.
Figure 5:
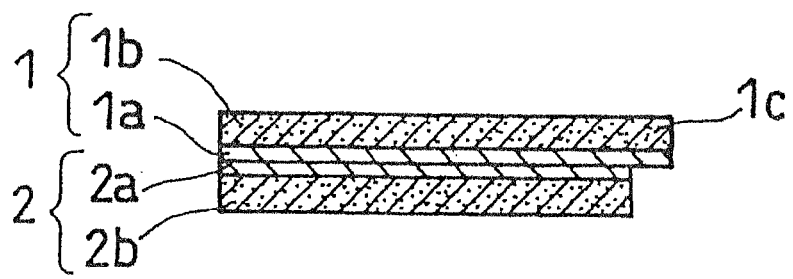
FIG. 5 is a longitudinal sectional view of the first electrode of FIG. 3 cut along line A-A.
Figure 6:
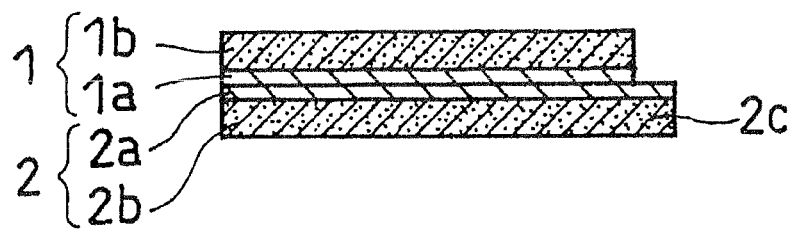
FIG. 6 is a longitudinal sectional view of the first electrode of FIG. 3 cut along line B-B.
Figure 7:
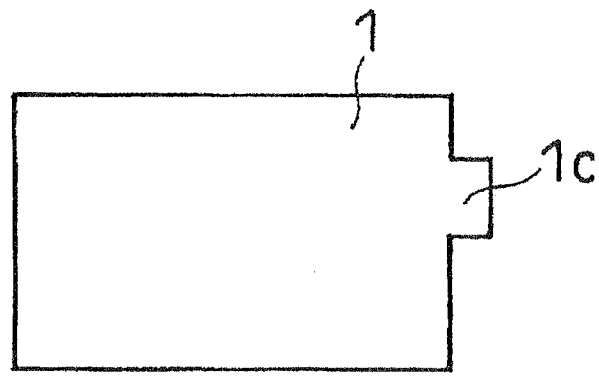
FIG. 7 shows a first positive electrode section and a second positive electrode section of the first electrode of FIG. 3, which are at spaced locations.
Figure 7:
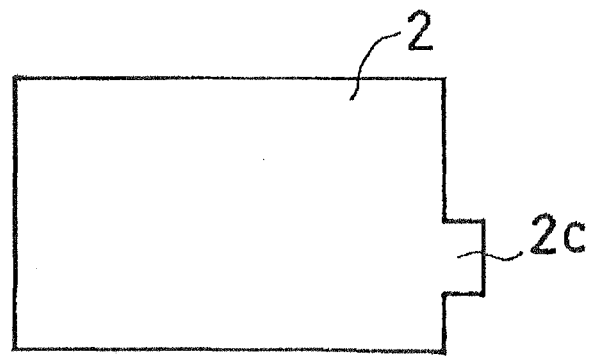

FIG. 3 is a top view of the positive electrode 3, and FIG. 4 is a bottom view of the positive electrode 3. FIG. 5 is a longitudinal sectional view of the positive electrode of FIG. 3 cut along line A-A, and FIG. 6 is a longitudinal sectional view of the positive electrode of FIG. 3 cut along line B-B. FIG. 7 illustrates the first positive electrode section 1 and the second positive electrode section 2, which constitute the positive electrode of FIG. 3.

As illustrated in FIGS. 3 to 6, the first positive electrode section 1 and the second positive electrode section 2 of the positive electrode are laminated such that the face of the current collector 1a not carrying the active material layer and the face of the current collector 2a not carrying the active material layer are in contact with each other. The first positive electrode section 1 has a protruding part 1c, while the second positive electrode section 2 has a protruding part 2c. As illustrated in FIG. 5, even when the first positive electrode section 1 and the second positive electrode section 2 are laminated such that the current collectors are in contact with each other, the positive electrode current collector of the first positive electrode section 1 is exposed due to the provision of the protruding part 1c. Also, as illustrated in FIG. 6, the positive electrode current collector of the second positive electrode section 2 is exposed due to the provision of the protruding part 2c. It is preferable that the protruding part 1c and the protruding part 2c not overlap each other.

The shape of the protruding part is not particularly limited as long as the protruding part is connected to the terminal in a reliable manner. For example, the shape of the protruding part may be, for example, rectangular, triangular, or trapezoidal.

The relation between the length Wt of the side of the protruding part 2c parallel to the width direction thereof, the length Wu of the side of the protruding part 1c parallel to the width direction thereof, and the length Ws of the side of the positive electrode parallel to the width direction thereof preferably satisfies Ws≧Wt+Wu, and more preferably Ws>Wt=Wu. This ensures more reliable connection between the respective positive electrodes and the first terminal.

Also, the exposed area Su of current collector of the protruding part 1c and the exposed area St of current collector of the protruding part 2c are preferably the same. In this case, the first positive electrode section 1 and the second positive electrode section 2 have the same connection resistance.

The protruding length of the protruding part can be 0.5 mm to 1 cm. In this case, the effects of the invention can be sufficiently obtained.

Referring to FIGS. 8 to 11, the negative electrode 6 is described.

Figure 8:
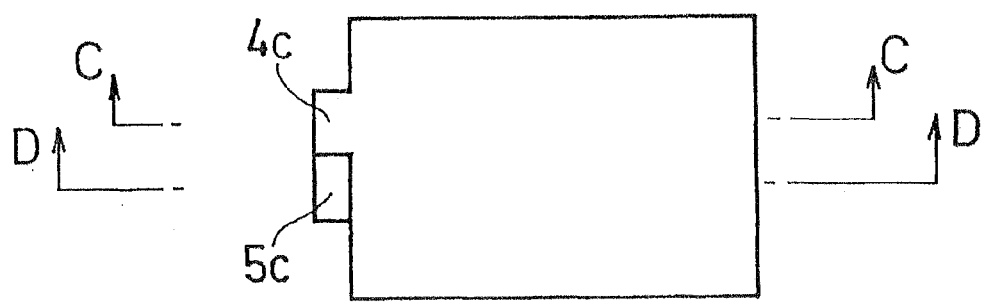
FIG. 8 is a schematic top view of an exemplary second electrode included in the battery according to one embodiment of the present invention.
Figure 9:
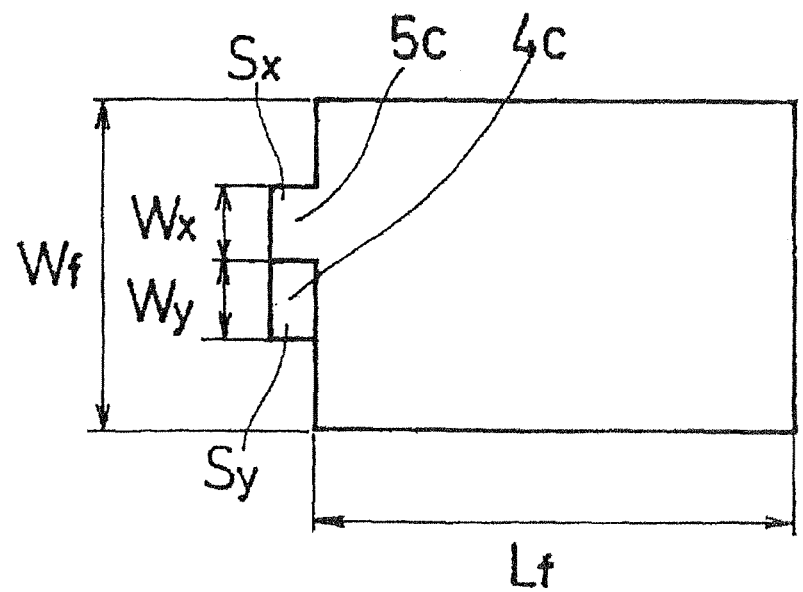
FIG. 9 is a schematic bottom view of the exemplary second electrode included in the battery according to one embodiment of the present invention.
Figure 10:
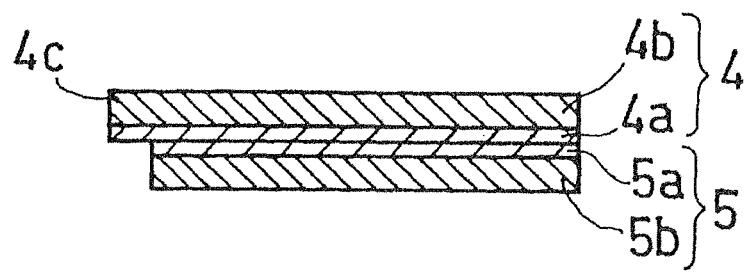
FIG. 10 is a longitudinal sectional view of the second electrode of FIG. 8 cut along line C-C.

FIG. 8 is a top view of the negative electrode 6, and FIG. 9 is a bottom view of the negative electrode 6. FIG. 10 is a longitudinal sectional view of the negative electrode of FIG. 8 cut along line C-C, and FIG. 11 is a longitudinal sectional view of the negative electrode of FIG. 8 cut along line D-D.

Figure 11:
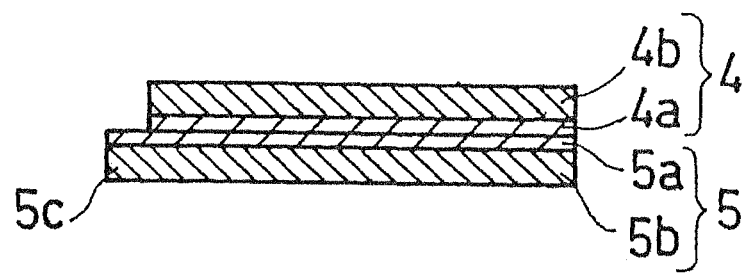
FIG. 11 is a longitudinal sectional view of the second electrode of FIG. 8 cut along line D-D.

As illustrated in FIGS. 8 to 11, the first negative electrode section 4 and the second negative electrode section 5 of the negative electrode 6 are laminated such that the face of the current collector 4a not carrying the active material layer and the face of the current collector 5a not carrying the active material layer are in contact with each other. The first negative electrode section 4 has a protruding part 4c, while the second negative electrode section 5 has a protruding part 5c. As illustrated in FIG. 10, even when the first negative electrode section 4 and the second negative electrode section 5 are laminated such that the current collectors are in contact with each other, the negative electrode current collector of the first negative electrode section 4 is exposed due to the provision of the protruding part 4c. Also, as illustrated in FIG. 11, the negative electrode current collector of the second negative electrode section 5 is exposed due to the provision of the protruding part 5c. In the same manner as in the above, it is preferable that the protruding part 4c and the protruding part 5c not overlap each other.

The relation between the length Wy of the side of the protruding part 4c parallel to the width direction thereof, the length Wx of the side of the protruding part 5c parallel to the width direction thereof, and the length Wf of the side of the negative electrode parallel to the width direction thereof preferably satisfies Wf≧Wx+Wy, and more preferably Wf>Wx=Wy. The exposed area Sy of current collector of the protruding part 4c and the exposed area Sx of current collector of the protruding part 5c are preferably the same. The reasons for these are the same as those for the positive electrode.

Figure 12:
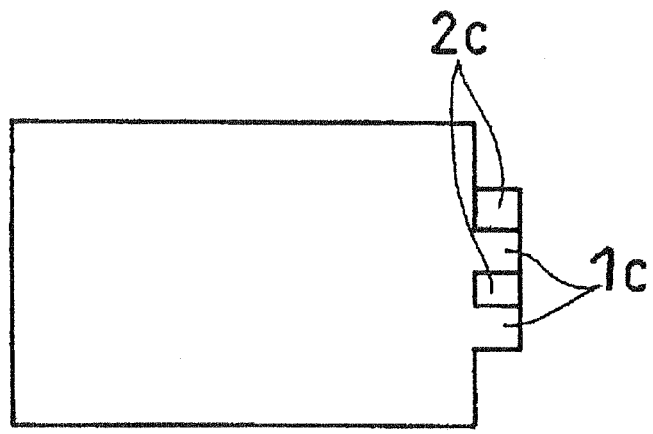
FIG. 12 is a schematic top view of a first electrode included in a battery according to another embodiment of the present invention.
Figure 13:
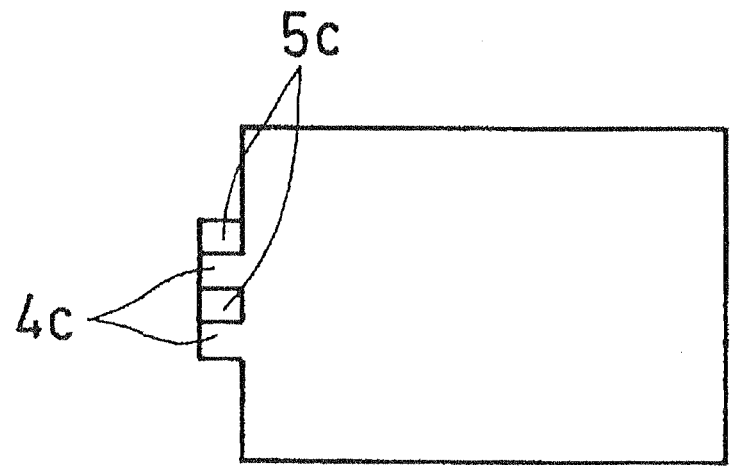
FIG. 13 is a schematic top view of a second electrode included in the battery according to another embodiment of the present invention.

As illustrated in FIG. 12 and FIG. 13, each of the two electrode sections may have two protruding parts.

For example, the positive electrode is preferably as illustrated in FIG. 12, in which the two protruding parts 1c of the first positive electrode section 1 and the two protruding parts 2c of the second positive electrode section 2 are alternately disposed in the width direction of the positive electrode. It is also preferable that the respective protruding parts not overlap one another.

Also, the negative electrode is preferably as illustrated in FIG. 13, in which the two protruding parts 4c and the two protruding parts 5c are alternately disposed in the width direction of the negative electrode. It is also preferable that the respective protruding parts not overlap one another.

In FIGS. 12 and 13, each electrode section has two protruding parts, but each electrode section may have three or more protruding parts.

The two electrode sections of the positive electrode may be formed by folding one electrode plate including a positive electrode current collector and a positive electrode active material layer carried on one face thereof such that the folded faces of the current collector not carrying the active material layer are in contact with each other. Alternatively, the two electrode sections may be formed by laminating two electrode plates, each including a positive electrode current collector and a positive electrode active material layer carried on one face thereof, such that the faces of the current collectors not carrying the active material layer are in contact with each other, as illustrated in FIG. 1.

When the positive electrode is formed by folding one electrode plate, a protruding part is provided for each of the two sides of the electrode plate parallel to the folding axis thereof. These protruding parts are disposed such that they do not overlap each other when the electrode plate is folded. Each side may have one protruding part or two or more protruding parts.

Figure 14:
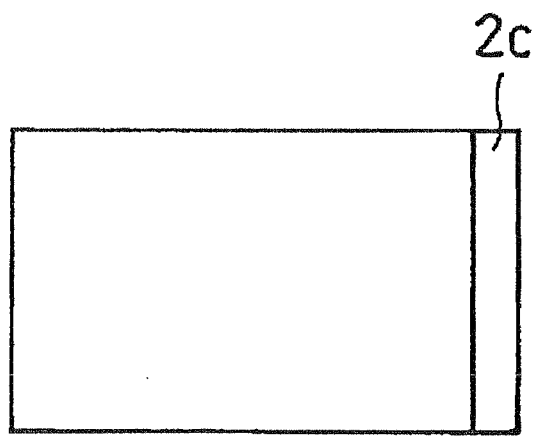
FIG. 14 is a schematic top view of an electrode included in a battery according to still another embodiment of the present invention.

Alternatively, only one electrode section of the positive electrode may have a protruding part throughout the width of the electrode plate. FIG. 14 illustrates a positive electrode having only a protruding part 2c, the protruding part 2c being disposed throughout the width of the electrode plate.

When the positive electrode is formed from one electrode plate, the positive electrode of FIG. 14 can be formed by folding the one electrode plate in such a manner that the two sides of the electrode plate parallel to the folding axis thereof are shifted in the length direction of the electrode plate.

When the positive electrode is formed from two electrode plates, each of the electrode plates is provided with a protruding part on the same side, and these protruding parts do not overlap each other.

This also applies to the negative electrode.

In lithium ion secondary batteries, when the positive electrode is larger in size than the negative electrode, the negative electrode may have lithium dendrites on charge/discharge. It is thus preferable that the positive electrode be smaller than the negative electrode. Specifically, the total Ls of the length of the side of the positive electrode of FIG. 4 parallel to the length direction thereof and the length of the protruding part is preferably less than the length Lf of the side of the negative electrode of FIG. 9 parallel to the length direction thereof (excluding the length of the protruding part). Also, the length Ws of the side of the positive electrode parallel to the width direction thereof is preferably less than the length Wf of the side of the negative electrode parallel to the width direction thereof.

In the positive electrode and the negative electrode, the thickness of the active material layer carried on the current collector is changed as appropriate depending on the capacity design of the battery. For example, the thickness of the active material layer can be 1 μm to 150 μm.

Next, an exemplary method for producing the electrode plate group of FIG. 1 is described.

Figure 15:
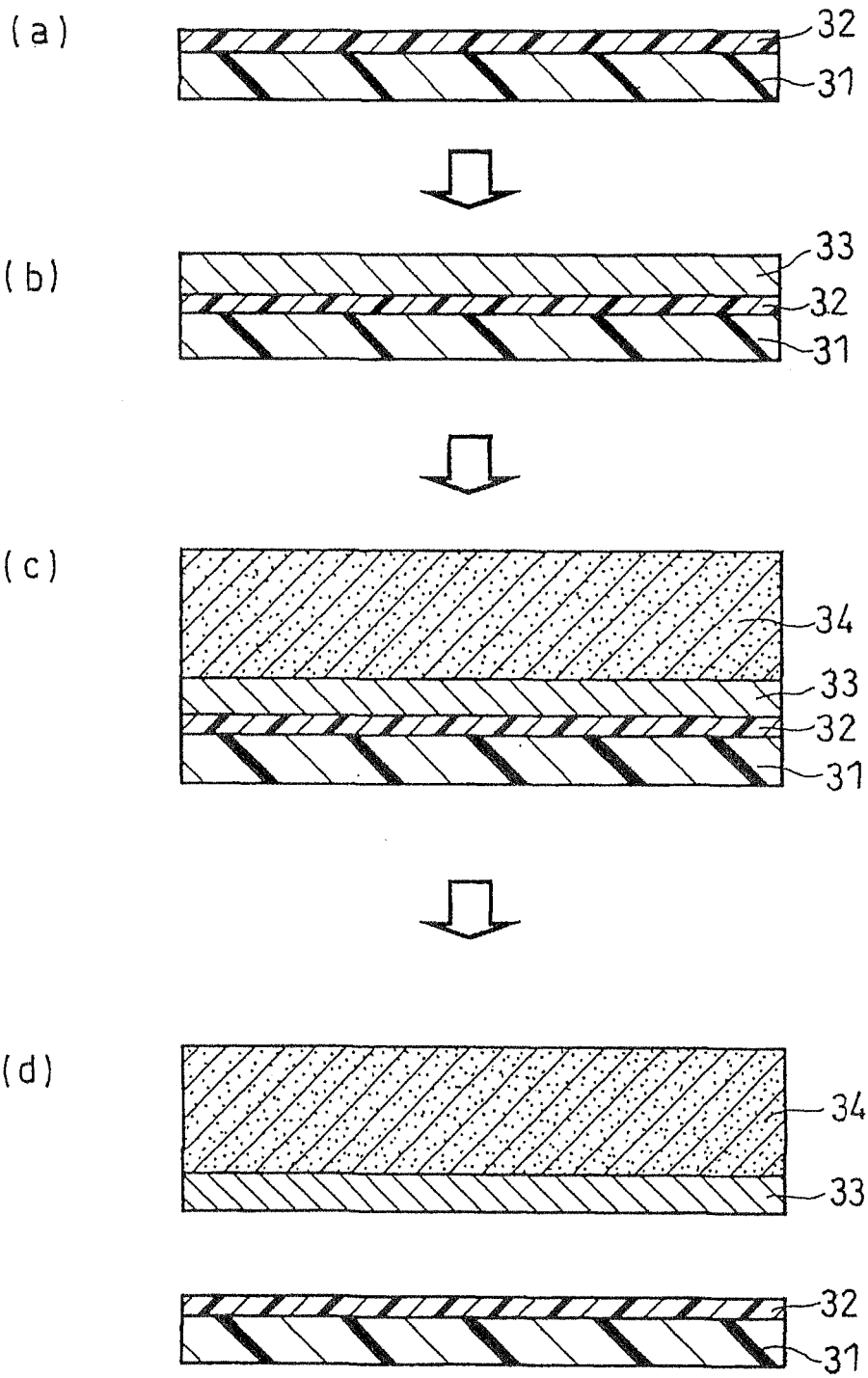
FIG. 15 shows steps for producing a current collector and an active material layer carried thereon.

First, referring to FIG. 15, an exemplary method for producing the positive electrode and the negative electrode is described.

(a) Preparation of Positive Electrode

As illustrated in FIG. 15(a), a resin sheet 31 of a predetermined size with a release agent (parting agent) 32 is prepared. The release agent is desirably a melanine-type one which does not contain Si. If it contains Si, it may be difficult to remove a metal film from the resin sheet.

Subsequently, a mask having an opening of a predetermined shape and size is placed on the release agent 32 of the resin sheet 31. A predetermined metal is deposited on the area of the resin sheet 31 exposed from the opening, to form a positive electrode current collector 33 made of a metal thin film (FIG. 15(b)). The deposition of metal can be performed by vapor deposition or the like.

Thereafter, a positive electrode mixture paste is applied onto the whole area of the positive electrode current collector 33, followed by drying. After the drying, the resultant coating film is rolled to form a positive electrode active material layer 34 on the current collector (FIG. 15(c)). The rolling of the coating film can be performed, for example, by using rollers. Since the dried coating film is rolled, the density of the active material layer increases.

The positive electrode mixture paste can be prepared by mixing a positive electrode active material, a conductive agent, a binder, and the like with a dispersion medium in a predetermined ratio.

When the battery to be produced is a lithium ion secondary battery, a positive electrode active material, a conductive agent, and a binder, as described above, can be used. Also, the dispersion medium is selected as appropriate depending on the kinds of the active material, conductive agent, and binder used.

The application method of the positive electrode mixture paste onto the current collector is not particularly limited, and a method known in the art can be used. For example, screen printing and pattern application can be used.

Next, the resultant laminate sheet is cut into a predetermined size and shape, to obtain an electrode plate precursor. The electrode plate precursor has at least one protruding part.

Thereafter, the resin sheet 31 with the release agent 32 is removed from the current collector 33 (FIG. 15(d)). This produces an electrode plate with a protruding part, which includes a positive electrode current collector and a positive electrode active material layer carried thereon. In FIG. 15, the protruding part is not shown.

Two electrode plates prepared in this manner are laminated such that the current collectors are in contact with each other, to obtain a positive electrode. The two electrode plates are laminated such that the protruding parts are positioned on the same side of the positive electrode.

Alternatively, a positive electrode can also be obtained by preparing one electrode plate having at least one protruding part on both ends, and folding the electrode plate such that the folded faces of the collectors are in contact with each other. In this case, also, the protruding parts are positioned on only one side of the positive electrode.

(b) Preparation of Negative Electrode

The negative electrode can be basically prepared in the same manner as the positive electrode.

A resin sheet of a predetermined size with a release agent is prepared. A mask having an opening of a predetermined shape and size is placed on the release agent of the resin sheet. A predetermined metal is deposited on the area of the resin sheet exposed from the opening, to form a negative electrode current collector.

Subsequently, a negative electrode mixture paste is applied onto the whole area of the negative electrode current collector, followed by drying. After the drying, the resultant coating film is rolled to form a negative electrode active material layer on the current collector.

The negative electrode mixture paste can be prepared by mixing a negative electrode active material, a binder, if necessary a conductive agent or the like with a dispersion medium in a predetermined ratio.

When the battery to be produced is a lithium ion secondary battery, a negative electrode active material, a conductive agent, and a binder, as described above, can be used. The dispersion medium is selected as appropriate depending on the kinds of the active material, conductive agent, and binder used.

When the negative electrode active material contains at least one of Si, SiOx, and Sn, the negative electrode active material layer may be a deposited film containing at least one such element. The deposited film can be prepared, for example, by sputtering and vapor deposition.

Next, the resultant laminate sheet is cut into a predetermined size and shape, to obtain an electrode plate precursor. The electrode plate precursor has at least one protruding part.

Thereafter, the resin sheet with the release agent is removed from the current collector. This produces an electrode plate with a protruding part, which includes a negative electrode current collector and a negative electrode active material layer carried thereon.

In the same manner as in the positive electrode, a negative electrode can be obtained by laminating two electrode plates such that the current collectors are in contact with each other. Alternatively, a negative electrode can also be obtained by preparing one electrode plate having at least one protruding part on both ends, and folding the electrode plate such that the folded faces of the current collectors are in contact with each other.

A commonly used current collector made of a metal foil may also be used to produce a positive electrode and a negative electrode.

(c) Fabrication of Electrode Plate Group

A belt-like separator is folded in a zigzag manner, to form a layered structure in which first-electrode holding parts and second-electrode holding parts are alternately aligned. The resultant layered structure has four first-electrode holding parts and three second-electrode holding parts.

Positive electrodes and negative electrodes thus obtained are disposed in the first-electrode holding parts and the second-electrode holding parts, as illustrated in FIGS. 16 to 18 or FIGS. 19 to 21. At this time, the positive electrode active material layers of the positive electrodes are opposed to the negative electrode active material layers of the negative electrodes with the separator interposed there between.

Figure 16:
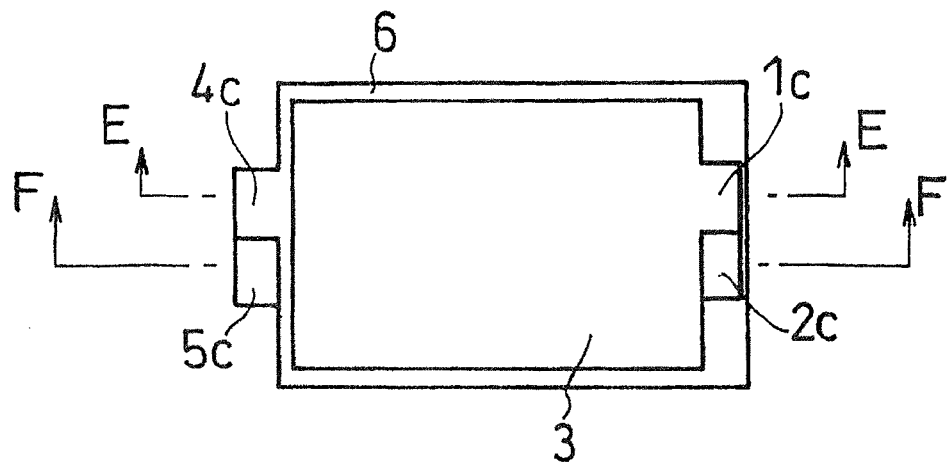
FIG. 16 is a top view of the arrangement of a first electrode and a second electrode of an electrode plate group included in a battery according to one embodiment of the present invention.
Figure 17:
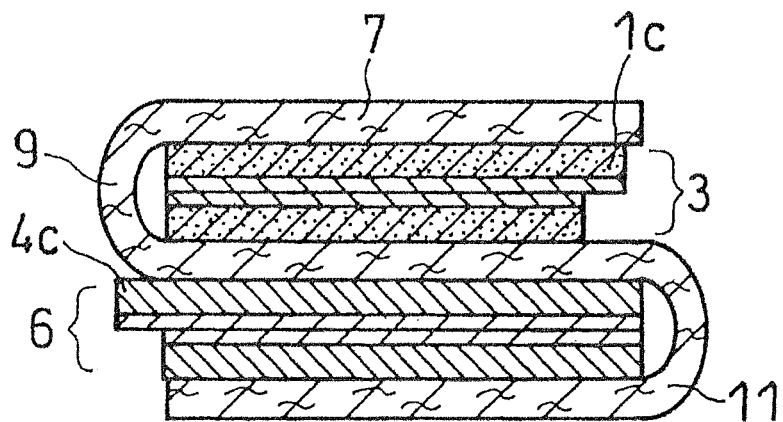
FIG. 17 is a longitudinal sectional view of FIG. 16 taken along line E-E.
Figure 18:
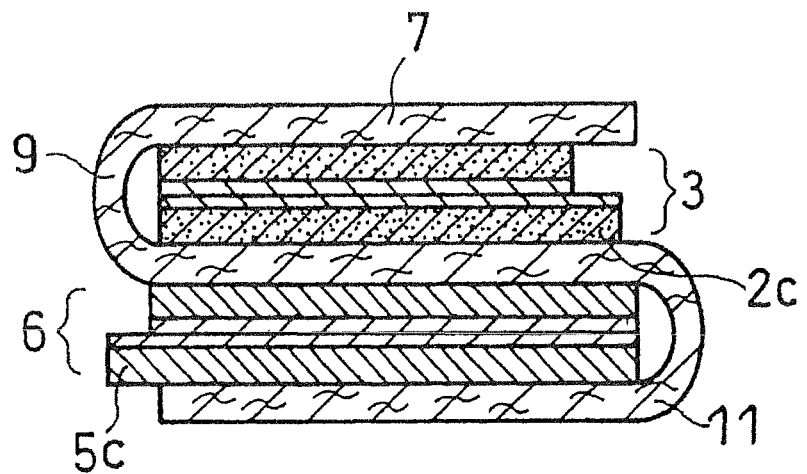
FIG. 18 is a longitudinal sectional view of FIG. 16 taken along line F-F.
Figure 19:
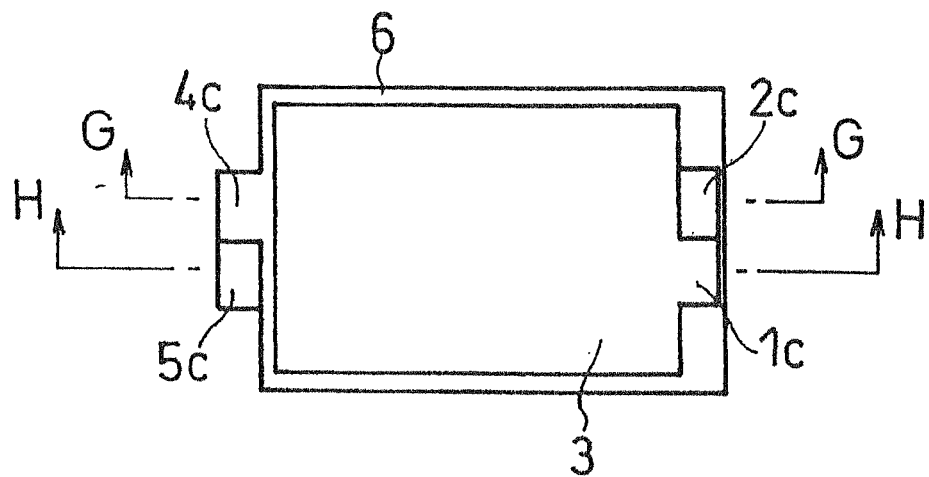
FIG. 19 is a top view of the arrangement of a first electrode and a second electrode of an electrode plate group included in a battery according to another embodiment of the present invention.
Figure 20:
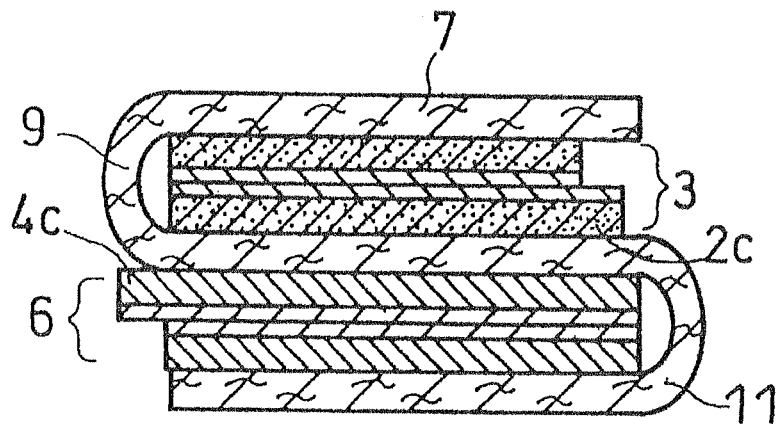
FIG. 20 is a longitudinal sectional view of FIG. 19 taken along line G-G.
Figure 21:
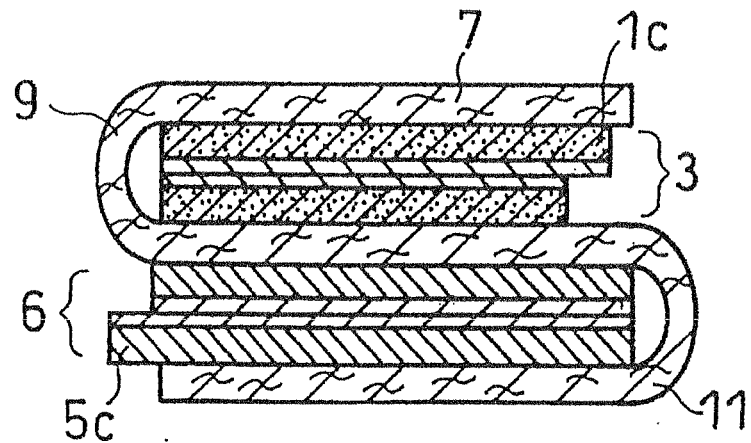
FIG. 21 is a longitudinal sectional view of FIG. 19 taken along line H-H.

FIGS. 16 to 18 are different from FIGS. 19 to 21 in that in the positive electrode 3, the position of the protruding part 1c of the first positive electrode section and the position of the protruding part 2c of the second positive electrode section are opposite.

FIG. 16 is a top view of a laminate of a positive electrode and a negative electrode which are laminated with a separator interposed there between. FIG. 17 is a longitudinal sectional view of FIG. 16 taken along line E-E, and FIG. 18 is a longitudinal sectional view of FIG. 16 taken along line F-F.

FIG. 19 is a top view of a laminate of a negative electrode and a positive electrode having protruding parts at positions different from those for the positive electrode of FIG. 16, which are laminated with a separator interposed there between. FIG. 20 is a longitudinal sectional view of FIG. 19 taken along line G-G, and FIG. 21 is a longitudinal sectional view of FIG. 19 taken along line H-H.

In FIG. 16 and FIG. 19, the separator is not shown.

Figure 22:
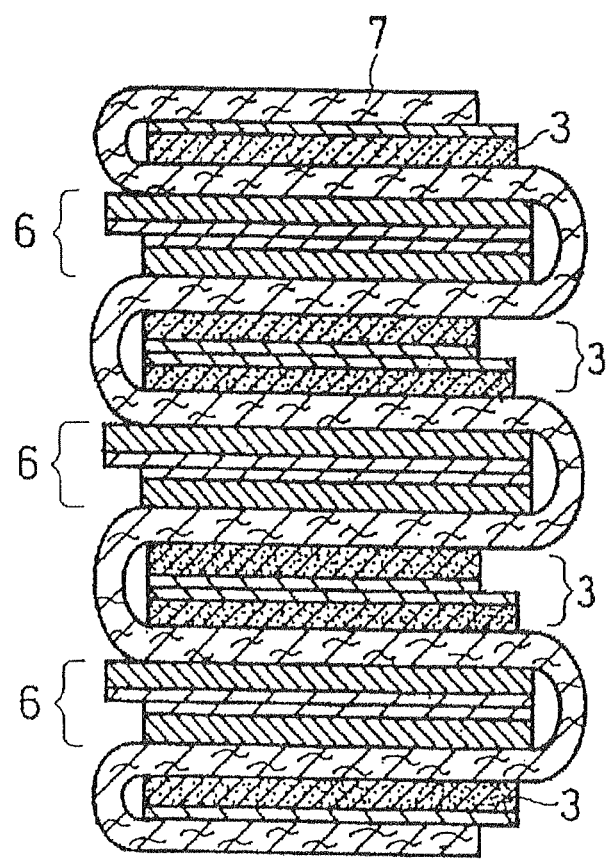

As described above, four positive electrodes 3 and three negative electrodes 6 are alternately laminated with the separator interposed there between, to form a structure as illustrated in FIG. 22.

The first-electrode holding part at each end of the layered structure of the separator in the thickness direction thereof accommodates one electrode plate including a positive electrode current collector and a positive electrode active material layer carried on one face thereof. The active material layer of the positive electrode accommodated in the electrode-holding part at each end thereof is opposed to the active material layer of the negative electrode accommodated in the adjacent second-electrode holding part with the separator interposed there between.

Subsequently, the resultant whole structure is pressed in the laminating direction of the positive electrodes and the negative electrodes, to form an assembly of the plurality of positive and negative electrodes and the separator. The pressing may be optional.

The position of the positive electrodes and the position of the negative electrodes may be interchanged. In this case, the holding part at each end of the assembly in the laminating direction thereof accommodates a negative electrode composed of one negative electrode section.

Figure 23:
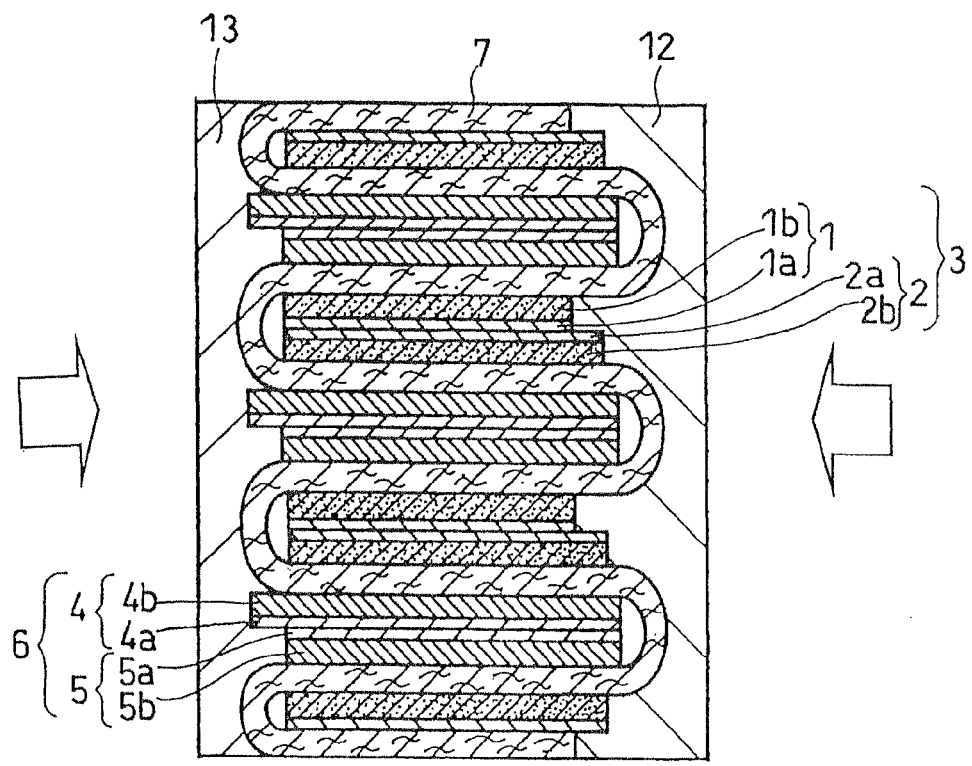
FIG. 23 is a schematic longitudinal sectional view of the electrode plate group of FIG. 22 having a first terminal and a second terminal formed at different end faces.

Next, as illustrated in FIG. 23, a first terminal (positive electrode current-collecting terminal) 12 is formed in the region where the protruding parts of the positive electrodes 3 are exposed (first end face), so as to connect the respective positive electrodes in parallel. The first terminal 12 can be formed, for example, by spraying a molten or semi-molten predetermined metal on the first end face.

Likewise, a second terminal (negative electrode current-collecting terminal) 13 is formed on the second end face where the protruding parts of the negative electrodes 6 are exposed, so as to connect the respective negative electrodes in parallel. The second terminal 13 can be formed, for example, by spraying a molten or semi-molten metal which is different from the metal of the first terminal on the second end face.

The spraying of the molten or semi-molten metal can be performed, for example, by using compressed air to force the molten or semi-molten metal out of a nozzle.

Thereafter, a positive electrode lead 14 is attached to the first terminal 12, while a negative electrode lead 15 is attached to the second terminal 13. This produces an electrode plate group as illustrated in FIG. 1.

The other regions of the electrode plate group not having the first terminal and the second terminal may remain uncovered or may be covered with an insulating material.

The positive electrode lead 14 can be formed by thermally spraying metal aluminum or the like on the first terminal 12. Alternatively, a metal lead made of metal aluminum or the like is welded to the first terminal to form a positive electrode lead. Likewise, the negative electrode lead 15 can be formed by thermally spraying metal nickel or the like on the second terminal 13. Alternatively, a metal lead made of metal nickel or the like is welded to the second terminal to form a negative electrode lead.

The positive electrode lead 14 and the negative electrode lead 15 may be embedded in the first terminal 12 and the second terminal 13, respectively. For example, the positive electrode lead can be embedded, for example, by forming a first terminal, disposing a positive electrode lead on the first terminal, and thermally spraying the metal constituting the first terminal again. The negative electrode lead can be embedded in the same manner.

The electrode plate group as illustrated in FIG. 1 is usually accommodated in a predetermined case together with an electrolyte, and the opening of the case is sealed to form a battery.

With respect to the shape, material, etc. of the case, there is no particular limitation. For example, the case can be a case obtained by working a stainless steel plate, an aluminum plate or the like into a predetermined shape, a case made of an aluminum foil having a resin coating film on each side thereof (aluminum laminate sheet), a resin case, etc.

The kind of the electrolyte used is changed as appropriate depending on the kind of the battery. For example, the electrolyte used in lithium ion secondary batteries is composed of a non-aqueous solvent and a lithium salt dissolved in the non-aqueous solvent. In this case, the concentration of the lithium salt dissolved in the electrolyte is preferably set to 0.5 to 1.5 mol/L.

Examples of non-aqueous solvents which can be used include cyclic carbonates such as ethylene carbonate, propylene carbonate, butylene carbonate, and vinylene carbonate, non-cyclic carbonates such as dimethyl carbonate, diethyl carbonate, ethyl methyl carbonate, ethyl propyl carbonate, methyl propyl carbonate, methyl isopropyl carbonate, and dipropyl carbonate, aliphatic carboxylic acid esters such as methyl formate, methyl acetate, methyl propionate, and ethyl propionate, γ-lactones such as γ-butyrolactone and γ-valerolactone, non-cyclic ethers such as 1,2-dimethoxyethane, 1,2-diethoxyethane, and ethoxymethoxyethane, cyclic ethers such as tetra hydrofuran and 2-methyl-tetra hydrofuran, dimethyl sulfoxide, 1,3-dioxolane, phosphoric acid alkyl esters such as trimethyl phosphate, triethyl phosphate, and trioctyl phosphate, and fluorides thereof. They may be used singly or in combination of two or more of them. Among them, preferred are mixtures containing a cyclic carbonate and a non-cyclic carbonate and mixtures containing a cyclic carbonate, a non-cyclic carbonate, and an aliphatic carboxylic acid ester.

Examples of lithium salts which can be used include $LiPF_6$, $LiBF_4$, $LiClO_4$, $LiAlCl_4$, $LiSbF_6$, $LiSCN$, $LiCl$, $LiCF_3SO_3$, $LiCF_3CO_2$, $LiAsF_6$, $LiN(CF_3SO_2)_2$, $Li_2B_{10}Cl_{10}$, $LiN(C_2F_5SO_2)_2$, $LiPF_3(CF_3)_3$, and $LiPF_3(C_2F_5)_3$. They may be used singly or in combination of two or more of them. The lithium salt preferably contains at least $LiPF_6$.

By the production methods as described above, an electrode plate group of a desired size can be efficiency produced if it has, for example, a length of 10 to 300 mm, a width of 10 to 300 mm, and a thickness of 0.1 to 5 mm.

EXAMPLE 1

The present invention is herein after described by way of an Example. In this example, lithium ion secondary batteries were produced. In the batteries produced, the first electrode was a positive electrode, and the second electrode was a negative electrode. The following Example is not to be construed as limiting the present invention.
(Battery A)
(a) Preparation of Positive Electrode A polyethylene terephthalate (PET) film of a predetermined length with a release agent was prepared. The PET film had a width of 100 mm and a thickness of 7 μm.

Using a predetermined vapor deposition device and a mask with an opening of 80 mm×50 mm, an Al deposited film was formed as a positive electrode current collector on the face of the PET film with the release agent. The Al deposited film had a width of 80 mm, a length of 1 m, and a thickness of 1 μm.

A positive electrode mixture paste was prepared by mixing 100 parts by weight of lithium cobaltate ($LiCoO_2$) serving as a positive electrode active material, 3 parts by weight of acetylene black as a conductive agent, 7 parts by weight of polyvinylidene fluoride as a binder, and a suitable amount of carboxymethyl cellulose aqueous solution as a dispersion medium. This paste was applied onto the whole surface of the Al deposited film to form a coating film layer with a width of 80 mm and a length of 1 m. Thereafter, the coating film layer was dried and rolled to a thickness of 70 μm with rollers, to obtain a positive electrode active material layer.

Subsequently, the resultant laminate sheet composed of the PET film with the release agent, the positive electrode current collector, and the positive electrode active material layer was punched out, to obtain an electrode plate precursor. The electrode plate precursor was in the shape of a rectangle of a length of 150 mm and a width of 45 mm having two protruding parts. The protruding parts were rectangular. A first protruding part was provided for one of the sides of the rectangle parallel to the width direction thereof, while a second protruding part was provided for the other side. These protruding parts had a protruding length of 3 mm and a width of 10 mm. The sides of each protruding part parallel to the protruding direction thereof were parallel to the length direction of the rectangle. The sides of each protruding part parallel to the width direction thereof were parallel to the width direction of the rectangle.

The position of center of the sides of the first protruding part parallel to the width direction thereof and the position of center of the sides of the second protruding part parallel to the width direction thereof were shifted 5 mm from the position of center of the sides of the rectangle parallel to the width direction thereof in the mutually opposite directions.

The PET film with the release agent was removed from the electrode plate precursor, to obtain a positive electrode plate with the two protruding parts comprising the positive electrode current collector and the positive electrode active material layer carried thereon.

The electrode plate obtained was folded along the folding axis which passed through the center of the sides of the electrode plate parallel to the length direction thereof and was parallel to the sides parallel to the width direction thereof, so that the folded faces of the current collector were in contact with each other. This produced a positive electrode of (75 mm+protruding part 3 mm)×45 mm. At this time, the first and second protruding parts did not overlap each other since their positions were shifted in the opposite directions.

In this way, four positive electrodes were prepared.

Further, two electrode plates each including a positive electrode current collector and a positive electrode active material layer carried on one face thereof were prepared. These electrode plates can be obtained by cutting a positive electrode plate produced in the above manner.
(b) Preparation of Negative Electrode A PET film of a predetermined length with a release agent was prepared. The PET film had a width of 100 mm and a thickness of 7 μm.

Subsequently, using a predetermined vapor deposition device and a mask with an opening of 80 mm×50 mm, a Cu deposited film was formed as a negative electrode current collector on the face of the PET film with the release agent. The Cu deposited film had a width of 80 mm, a length of 1 m, and a thickness of 1 μm.

A negative electrode mixture paste was prepared by mixing 100 parts by weight of spherical graphite (graphitized mesophase microspheres) serving as a negative electrode active material, 10 parts by weight of styrene butadiene rubber as a binder, and a suitable amount of carboxymethyl cellulose aqueous solution as a dispersion medium.

This paste was applied onto the whole surface of the Cu deposited film to form a coating film layer with a width of 80 mm and a length of 1 m. Thereafter, the coating film layer was dried and rolled to a thickness of 73 µm with rollers, to obtain a negative electrode active material layer.

Subsequently, the resultant laminate sheet composed of the PET film with the release agent, the negative electrode current collector, and the negative electrode active material layer was punched out, to obtain an electrode plate precursor. The electrode plate precursor was in the shape of a rectangle of a length of 160 mm and a width of 47 mm having two protruding parts. The protruding parts were rectangular in the same manner as in the positive electrode. A first protruding part was provided for one of the sides of the rectangle parallel to the width direction thereof, while a second protruding part was provided for the other side of the rectangle parallel to the width direction thereof. These protruding parts had a protruding length of 3 mm and a width of 10 mm. The sides of each protruding part parallel to the protruding direction thereof were parallel to the length direction of the rectangle. The sides of each protruding part parallel to the width direction thereof were parallel to the width direction of the rectangle.

The position of center of the sides of the first protruding part parallel to the width direction thereof and the position of center of the sides of the second protruding part parallel to the width direction thereof were shifted 5 mm from the position of center of the sides of the rectangle parallel to the width direction thereof in the mutually opposite directions.

The PET film with the release agent was removed from the electrode plate precursor, to obtain a negative electrode plate with the two protruding parts comprising the negative electrode current collector and the negative electrode active material layer carried thereon.

The electrode plate obtained was folded along the folding axis which passed through the center of the sides (the sides of 160 mm) of the electrode plate parallel to the length direction thereof and was parallel to the sides (the sides of 47 mm) parallel to the width direction thereof, so that the folded faces of the current collector were in contact with each other. This produced a negative electrode of (80 mm+protruding part 3 mm)×47 mm. At this time, the respective protruding parts did not overlap each other since their positions were shifted in the opposite directions.

In this way, four negative electrodes were prepared.

(c) Fabrication of Electrode Plate Group

A separator with a width of 50 mm, a length of 814 mm, and a thickness of 0.016 mm was prepared. The separator used had a trilaminar structure of a polypropylene layer, a polyethylene layer, and a polypropylene layer.

The separator was folded at a position 75 mm away from one end thereof. It was then folded in the opposite direction at a position 83 mm away therefrom and again folded in the opposite direction to the previously folded direction at a position 83 mm away therefrom. In this way, the separator was folded 9 times to obtain a layered structure. The layered structure had a width of 50 mm and a length of 83 mm when seen from the folded direction. With respect to the uppermost and lowermost portions of the separator, the length thereof was reduced to 75 mm so that the current collector of the protruding part of the electrode was exposed.

The layered structure obtained by folding the separator had a first end face where four first bent parts were disposed and a second end face where five second bent parts were disposed. In the layered structure, the first side face was positioned on the opposite side of the second end face.

Of the five first-electrode holding parts, the holding parts excluding the uppermost holding part and the lowermost holding part accommodated the positive electrode composed of the two electrode sections such that the protruding parts protruded toward the open space of the first end face. The uppermost and lowermost holding parts accommodated the one electrode plate composed of the positive electrode current collector and the positive electrode active material layer carried on one face thereof. At this time, the positive electrode active material layers were opposed to the negative electrode active material layers with the separator interposed there between.

Each of the four second-electrode holding parts accommodated the negative electrode such that the protruding parts protruded toward the second end face.

Subsequently, the whole structure obtained was pressed to obtain an assembly.

A longitudinal section of the assembly showed the following lamination from top to bottom: separator, positive electrode current collector, positive electrode active material layer, separator, negative electrode active material layer, negative electrode current collector, negative electrode active material layer, separator, positive electrode active material layer, positive electrode current collector, positive electrode active material layer, separator, negative electrode active material layer, negative electrode current collector, negative electrode active material layer, separator, positive electrode active material layer, positive electrode current collector, positive electrode active material layer, separator, negative electrode active material layer, negative electrode current collector, negative electrode active material layer, separator, positive electrode active material layer, positive electrode current collector, positive electrode active material layer, separator, negative electrode active material layer, negative electrode current collector, negative electrode active material layer, separator, positive electrode active material layer, positive electrode current collector, and separator.

Also, the positive electrodes, separator, negative electrodes of the assembly were disposed such that when seen from the laminating direction, the negative electrodes were on the inside relative to the separator and that the positive electrodes were on the inside relative to the negative electrodes.

Subsequently, semi-molten Al fine particles were sprayed on the first end face where the protruding parts of the positive electrodes were exposed, to form an Al metal porous film serving as the first terminal. In this way, the protruding parts of the positive electrodes were connected to the first terminal. The first terminal had a thickness of 0.5 mm.

Likewise, semi-molten Cu fine particles were sprayed on the second end face where the protruding parts of the negative electrodes were exposed, to form a Cu metal porous film serving as the second terminal. In this way, the protruding parts of the negative electrodes were connected to the second terminal. The second terminal had a thickness of 0.5 mm.

Thereafter, a positive electrode lead made of metal aluminum was welded to the first terminal, while a negative electrode lead made of metal nickel was welded to the second terminal. These leads were welded to the terminals by ultrasonic welding. The bonding area of the first terminal and the positive electrode lead and the bonding area of the second terminal and the negative electrode lead were 0.5 cm$^2$. In this way, an electrode plate group was obtained.

The electrode plate group was then immersed in a predetermined electrolyte, so that the electrode plate group was sufficiently impregnated with the electrolyte. The electrolyte contained a solvent mixture of ethylene carbonate (EC) and ethyl methyl carbonate (EMC) in a volume ratio of 30:70 and LiPF$_6$ dissolved in the solvent mixture at a concentration of 1 mol/L.

Thereafter, the electrode plate group impregnated with the electrolyte was placed in a pouch made of an aluminum laminate sheet. With the positive electrode lead and the negative electrode lead drawn out of the pouch, the opening of the pouch was sealed by fusion. In this way, a lithium ion secondary battery was produced. This battery was designated as a battery A.

(Battery B)

The positive electrode plate used in the battery A was cut at the center of the sides parallel to the length direction (excluding the protruding parts), i.e., the above-mentioned folding axis, to obtain two electrode plates. These two electrode plates were laminated such that the current collectors were in contact with each other, to produce a positive electrode having two electrode sections. Likewise, the negative electrode plate used in the battery A was cut along the folding axis, to obtain two electrode plates. These two electrode plates were laminated such that the current collectors were in contact with each other, to produce a negative electrode having two electrode sections. Except for these, in the same manner as the battery A, a lithium ion secondary battery was produced. This battery was designated as a battery B. The battery B and the battery of FIG. 1 are the same except that the number of the first-electrode holding parts and the second-electrode holding parts are different.

(Battery C)

A battery C was produced in the same manner as the battery A except for the use of positive electrodes as shown in FIG. 12 and negative electrodes as shown in FIG. 13.

Positive electrodes were produced as follows.

The positive electrode plate used in the battery B was used, and each of the sides thereof parallel to the width direction was provided with two protruding parts (length 3 mm×width 5 mm). Specifically, a first protruding part and a second protruding part were provided for a first side of the positive electrode plate parallel to the width direction thereof. The position of center of the sides of the first protruding part parallel to the width direction thereof was shifted 2.5 mm from the position of center of the first side. The position of center of the sides of the second protruding part parallel to the width direction thereof was shifted 7.5 mm from the position of center of the first side in the direction opposite to the direction from the position of center of the first side to the position of the first protruding part.

Likewise, a second side of the positive electrode plate parallel to the width direction thereof was provided with a third protruding part and a fourth protruding part. The position of center of the sides of the third protruding part parallel to the width direction thereof was shifted 2.5 mm from the position of center of the second side. The position of center of the sides of the fourth protruding part parallel to the width direction thereof was shifted 7.5 mm from the position of center of the second side in the direction opposite to the direction from the position of center of the second side to the position of the third protruding part.

The direction from the position of center of the first side to the first protruding part was opposite to the direction from the position of center of the second side to the third protruding part.

Using such positive electrode plates, positive electrodes as illustrated in FIG. 12 were produced.

Negative electrodes were produced as follows.

The negative electrode plate used in the battery B was used, and each of the sides thereof parallel to the width direction was provided with two protruding parts (length 3 mm×width 5 mm). Specifically, a first side of the negative electrode plate parallel to the width direction thereof was provided with a first protruding part and a second protruding part. The position of center of the sides of the first protruding part parallel to the width direction thereof was shifted 2.5 mm from the position of center of the first side. The position of center of the sides of the second protruding part parallel to the width direction thereof was shifted 7.5 mm from the position of center of the first side in the direction opposite to the direction from the position of center of the first side to the position of the first protruding part.

Likewise, a second side of the negative electrode plate parallel to the width direction thereof was provided with a third protruding part and a fourth protruding part. The position of center of the sides of the third protruding part parallel to the width direction thereof was shifted 2.5 mm from the position of center of the second side. The position of center of the sides of the fourth protruding part parallel to the width direction thereof was shifted 7.5 mm from the position of center of the second side in the direction opposite to the direction from the position of center of the second side to the position of the third protruding part.

The direction from the position of center of the first side to the first protruding part was opposite to the direction from the position of center of the second side to the third protruding part.

Using such negative electrode plates, negative electrodes as illustrated in FIG. 13 were produced.

(Battery D)

An aluminum positive electrode lead was bonded to the first terminal by spraying semi-molten Al fine particles thereon, while a nickel negative electrode lead was bonded to the second terminal by spraying semi-molten Cu fine particles thereon. Except for this, in the same manner as the battery A, a battery D was produced.

(Battery E)

A battery E was produced in the same manner as the battery A, except that the thickness of the positive electrode current collector was set to 0.1 μm, and that the thickness of the negative electrode current collector was set to 0.1 μm.

(Battery F)

A battery F was produced in the same manner as the battery A except that the thickness of the positive electrode current collector was set to 5 μm, and that the thickness of the negative electrode current collector was set to 5 μm.

(Battery G)

A battery G was produced in the same manner as the battery A, except that a 10-μm thick Al foil sheet was used as the positive electrode current collector instead of the Al deposited film, and that a 10-μm thick Cu foil sheet was used as the negative electrode current collector instead of the Cu deposited film.

(Battery H)

A battery H was produced in the same manner as the battery A, except that the thickness of the positive electrode current collector was set to 0.05 μm, and that the thickness of the negative electrode current collector was set to 0.05 am.

(Comparative Battery I)

A comparative battery I was produced in the same manner as the battery A except for the use of positive and negative electrodes having no protruding part.

(Evaluation)

The batteries A to H and comparative battery I thus obtained were charged to a battery voltage of 4.2 V at a current value of 0.2 C. The charged batteries were then discharged to a battery voltage of 3.0 V at a current value of 0.2 C. The battery capacities obtained were defined as initial battery capacities.

Figure 24:
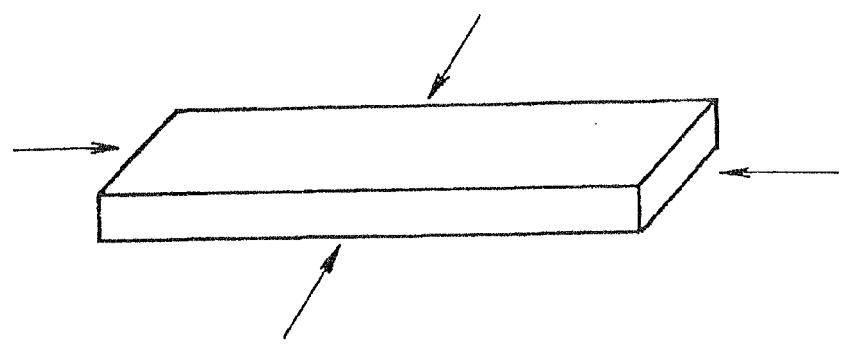
FIG. 24 shows four faces which are used as a bottom in a drop test.

After the measurement of the initial discharge capacities, the respective batteries were subjected to a drop test in which they were dropped from a height of 75 cm to a predetermined plate. At this time, as shown in FIG. 24, each battery was dropped with each of the four faces as indicated by the arrows being the bottom. Each battery was dropped five times per each face. After the drop test, each battery was charged and discharged under the same conditions as those for the measurement of the initial discharge capacity, to obtain the battery capacity. Table 1 shows the initial battery capacities and the battery capacities after the drop test. Table 1 also shows the thicknesses (mm) and the volume energy densities (Wh/L) of the respective batteries.

TABLE 1

|  | Initial battery capacity (mAh) | Volume energy density (Wh/L) | Battery thickness (mm) | Battery capacity after drop test (mAh) |
| --- | --- | --- | --- | --- |
| Battery A | 925 | 465 | 1.284 | 925 |
| Battery B | 925 | 465 | 1.284 | 925 |
| Battery C | 925 | 465 | 1.284 | 925 |
| Battery D | 925 | 465 | 1.284 | 925 |
| Battery E | 925 | 470 | 1.268 | 925 |
| Battery F | 925 | 445 | 1.355 | 925 |
| Battery G | 925 | 421 | 1.444 | 925 |
| Battery H | 702 | 393 | 1.267 | 702 |
| Comp. Battery I | 925 | 465 | 1.284 | 230 |

As shown in Table 1, the batteries A to H exhibited no change in battery capacity even after the drop test. On the other hand, the comparative battery I exhibited a large decline in battery capacity after the drop test.

After the evaluation, the comparative battery I was disassembled and cut, and the cross-section was observed with a scanning electron microscope (SEM). The result showed that the joints between the terminals and the current collectors were disconnected at several locations.

Also, the result of the charge/discharge capacities of the batteries E to G at 0.2 C indicated that as the thickness of the current collector increased, the volume energy density decreased.

The battery H exhibited a slightly lower initial battery capacity than the other batteries. The thickness of the positive electrode current collector composed of the Al deposited film and the thickness of the negative electrode current collector composed of the Cu deposited film were 0.05 μm, which means that the thickness of these current collectors is so thin as to allow light to pass through. Also, these current collectors are believed to be somewhat porous with pinholes and the like. This indicates that the resistance of the current collectors increased, thereby increasing the polarization of the electrodes and resulting in a capacity decline.

Industrial Applicability

According to the present invention, even when the current collector is thin, it is possible to provide a battery with surely improved current collecting ability. The use of such batteries makes it possible to provide highly reliable devices such as cellular phones, portable information devices, camcorders, personal computers, PDAs, portable audio devices, electric vehicles, and power sources for load leveling.

The invention claimed is:

1. A battery comprising:
   at least one first electrode,
   at least one second electrode, and
   a belt-like separator,
   wherein
   said separator is folded in a zigzag manner forming a layered structure having at least one first-electrode holding part and at least one second-electrode holding part which are alternately aligned,
   said layered structure has a first end face where at least one first bent part is disposed and a second end face where at least one second bent part is disposed, said first end face being positioned on the opposite side of said second end face,
   said first-electrode holding part has an open space on said first end face side while said second-electrode holding part has an open space on said second end face side, said first-electrode holding part housing said first electrode, and said second-electrode holding part housing said second electrode,
   said first electrode has two electrode sections, with each of the two electrode sections of said first electrode comprising a current collector and an active material layer carried on one face of said current collector, and each current collector of each of the two electrode sections of said first electrode is in contact with one another,
   said second electrode has two electrode sections, with each of the two electrode sections of said second electrode comprising a current collector and an active material layer carried on one face of said current collector, and each current collector of each of the two electrode sections of said second electrode is in contact with one another,
   one of said two electrode sections of one or both of said first and second electrodes protrudes relative to the other of said two electrode sections and toward either the open space on said first end face side or the open space on said second end face side to form a protruding part, said protruding part also comprising the current collector and the active material layer, and
   said first end face has a first terminal connected to said first electrode while said second end face has a second terminal connected to said second electrode.

2. The battery in accordance with claim 1, wherein each of said first terminal and said second terminal comprises a metal film.

3. The battery in accordance with claim 1, wherein in at least one of said first electrode and said second electrode, said two electrode sections are formed by folding one electrode plate comprising a current collector and an active material layer carried on one face of said current collector such that the folded faces of said current collector not carrying the active material layer are in contact with each other.

4. The battery in accordance with claim 3, wherein when said one electrode plate is folded, two sides of said electrode plate parallel to the folding axis thereof are shifted in the length direction of said electrode plate, so that only one of said two electrode sections has a protruding part throughout the width of the electrode section.

5. The battery in accordance with claim 1, wherein in at least one of said first electrode and said second electrode, said two electrode sections are formed by laminating two electrode plates, each comprising a current collector and an active material layer carried on one face of said current collector, such that the faces of said current collectors not carrying the active material layer are in contact with each other.

6. The battery in accordance with claim 1, wherein in at least one of said first electrode and said second electrode, each of said two electrode sections has said protruding part of equal area.

7. The battery in accordance with claim 1, wherein said first terminal and said second terminal each have a lead.

8. The battery in accordance with claim 1, wherein said current collector included in at least one of said first electrode and said second electrode has a thickness of 0.1 μm to 5 μm.

9. The battery in accordance with claim 1, wherein an electrode accommodated in each electrode-holding part at each end of said layered structure comprises an electrode plate comprising a current collector and an active material layer carried on one face of said current collector, and said active material layer is opposed to an active material layer of an electrode accommodated in an adjacent electrode-holding part with said separator interposed therebetween.

10. A battery comprising:
two first electrodes,
one second electrode, and
a belt-like separator,
wherein
said separator is folded in a zigzag manner forming a layered structure having two first-electrode holding parts and one second-electrode holding part interposed between the two first-electrode holding parts,
said layered structure has a first end face where one first bent part is disposed and a second end face where two second bent parts are disposed, said first end face being positioned on the opposite side of said second end face,
each of said first-electrode holding parts has an open space on said first end face side while said second-electrode holding part has an open space on said second end face side, each of said first-electrode holding parts housing each of said first electrodes, and said second-electrode holding part housing said second electrode,
each of said first electrodes has one electrode section comprising a current collector and an active material layer carried on one face of said current collector,
said second electrode has two electrode sections, with each of the two electrode sections of said second electrode comprising a current collector and an active material layer carried on one face of said current collector, and each current collector of each of the two electrode sections of said second electrode is in contact with one another,
the active material layer of each of said first electrodes is opposed to the active material layer of said second electrode with said separator interposed therebetween,
one of said two electrode sections of said second electrode protrudes relative to the other of said two electrode sections toward the open space on said second end face side to form a protruding part, said protruding part also comprising the current collector and the active material layer, and
said first end face has a first terminal connected to said first electrode while said second end face has a second terminal connected to said second electrode.

11. The battery in accordance with claim 1, wherein said separator is a one-part continuous sheet folded in a zigzag manner.

12. The battery in accordance with claim 2, wherein said current collector of said protruding part is covered with said metal film.

13. The battery in accordance with claim 2, wherein said metal film is a porous film.

14. The battery in accordance with claim 1, wherein the protruding length of said protruding part from the end of the other of said electrode sections, is 0.5 mm to 1 cm.

15. The battery in accordance with claim 6, wherein, in at least one of said first electrode and said second electrode, each of said two electrode sections has said protruding part that is tab-shaped and of equal area.

* * * * *